United States Patent
Fett

(10) Patent No.: US 6,293,889 B1
(45) Date of Patent: Sep. 25, 2001

(54) LIMITED SLIP MOTOR VEHICLE DIFFERENTIAL ASSEMBLY

(75) Inventor: Gregory A. Fett, Fort Wayne, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 08/697,065

(22) Filed: Aug. 19, 1996

(51) Int. Cl.$^7$ .................................................. F16H 48/20
(52) U.S. Cl. ............................ 475/230; 475/231; 464/89
(58) Field of Search .................................. 475/230, 231, 475/236, 242; 464/51, 87, 89

(56) References Cited

U.S. PATENT DOCUMENTS

| | | |
|---|---|---|
| 1,285,017 | 11/1918 | Brush . |
| 1,585,438 | 5/1926 | Taylor et al. . |
| 2,785,588 | 3/1957 | Sampietro ............................ 475/230 |
| 3,263,451 | * 8/1966 | Reimer .................................. 464/89 |
| 4,796,488 | * 1/1989 | Hagin et al. .......................... 74/443 |
| 5,383,811 | * 1/1995 | Campbell et al. ................. 464/89 X |
| 5,445,574 | * 8/1995 | Sekiguchi et al. ................. 464/89 X |

FOREIGN PATENT DOCUMENTS

| | | | |
|---|---|---|---|
| 90075 | * 8/1937 | (CH) | ...................... 464/89 |
| 1810520 | * 6/1970 | (DE) | ...................... 475/230 |
| 420149 | * 4/1991 | (EP) | ...................... 475/230 |
| 2682732 | * 4/1993 | (FR) | ...................... 475/230 |
| 58-207549 | * 12/1983 | (JP) | ...................... 475/230 |
| 4-272547 | * 9/1992 | (JP) | ...................... 475/230 |
| 4-321847 | * 11/1992 | (JP) | ...................... 475/230 |
| 1473986 | * 4/1989 | (SU) | ...................... 475/230 |

* cited by examiner

Primary Examiner—Sherry Estremsky
(74) Attorney, Agent, or Firm—Oldham & Oldham Co., L.P.A.

(57) ABSTRACT

Limited slip motor vehicle differential assemblies having a suitable high-shear strength, non-hardening, material which selectively resists slip or differentiation between the axle shafts and the differential housing, between the differential side gears and the differential housing, and/or between the differential side gears and the differential pinion gears when slip or differentiation occurs between two motor vehicle wheels mounted on the same axle. Such an arrangement provides some level of torque to each motor vehicle wheel at all times. The amount of resistance to slip or differentiation between the two motor vehicle wheels can be adjusted as desired by selecting an appropriate high-shear strength, non-hardening, material to provide the desired level of resistance to slip or differentiation between the two motor vehicle wheels in the motor vehicle differential assembly.

19 Claims, 4 Drawing Sheets

LIMITED SLIP MOTOR VEHICLE DIFFERENTIAL ASSEMBLY

BACKGROUND AND SUMMARY OF THE INVENTION

The present invention relates generally to new and novel limited slip motor vehicle differential assemblies. More particularly, the present invention relates to limited slip differential assemblies for motor vehicles which provide a predetermined amount of resistance to slip or differentiation between the differential side gears, the differential pinion gears and/or the axle shafts, and the differential housing to provide some minimum level of torque to each of the motor vehicle wheels at all times.

Motor vehicle differential assemblies have been in common use for many years to allow one motor vehicle wheel on an axle to rotate at a different rate than the other motor vehicle wheel, such as would occur when a motor vehicle is turning, or two tires having different diameters are being used on the same axle. However, to prevent "excessive" slip or differentiation between the motor vehicle wheels, as might occur when one tire encounters a low-traction condition, such as snow or ice, it is desirable for the motor vehicle differential assembly to include some provision to provide some minimum level of torque to each of the two motor vehicle wheels at all times.

Known prior art motor vehicle differential assembly "locking" systems have generally utilized clutch plates or other surfaces which are selectively brought into contact with each other to provide friction. These clutch plates or other surfaces are normally spring loaded and work to prevent differentiation to some degree by providing friction therebetween. Thus, in order for the axles to differentiate, this friction must be overcome. In addition, gear separation forces can act to further load or compress the frictional surfaces so that under high torque conditions, it becomes even more difficult to differentiate. While these types of motor vehicle differential systems will insure that some torque is going to both wheels under any condition, these types of systems can add considerable cost to the differential assembly because of their complexity. Limited slip differential systems are also known which rely on perforated plates that shear through a high viscosity liquid to create drag which must first be overcome before the axles can differentiate. These limited slip differential systems are also relatively expensive due to their complexity. Thus, a more cost-effective, simplified system of providing some minimum level of torque to each of the two motor vehicle wheels in a motor vehicle differential assembly would be desirable.

Preferred embodiments of the present invention are, therefor, directed to limited slip motor vehicle differential assemblies having a suitable high-shear strength, non-hardening, material which selectively resists slip or differentiation between the axle shafts and the differential housing, between the differential side gears and the differential housing, between the differential side gears and the differential pinion gears and/or between the differential pinion gears and the differential housing when slip or differentiation occurs between two motor vehicle wheels mounted on the same axle. Such an arrangement provides some level of torque to each motor vehicle wheel at all times. The amount of resistance to slip or differentiation between the two motor vehicle wheels can be adjusted as desired by selecting an appropriate high-shear strength, non-hardening, material to provide the desired level of resistance to slip or differentiation between the two motor vehicle wheels in the motor vehicle differential assembly.

Accordingly, limited slip motor vehicle differential assemblies in accordance with the present invention provide a simple, cost-effective, arrangement for providing some minimum level of torque to both wheels at all times. This can be particularly beneficial when one of the two motor vehicle wheels on the same axle encounters a low-traction condition, such as snow or ice.

Other advantages and novel features of the present invention will become apparent in the following detailed description of the invention when considered in conjunction with the accompanying drawings.

DETAILED DESCRIPTION OF THE DRAWINGS

Figure 1:
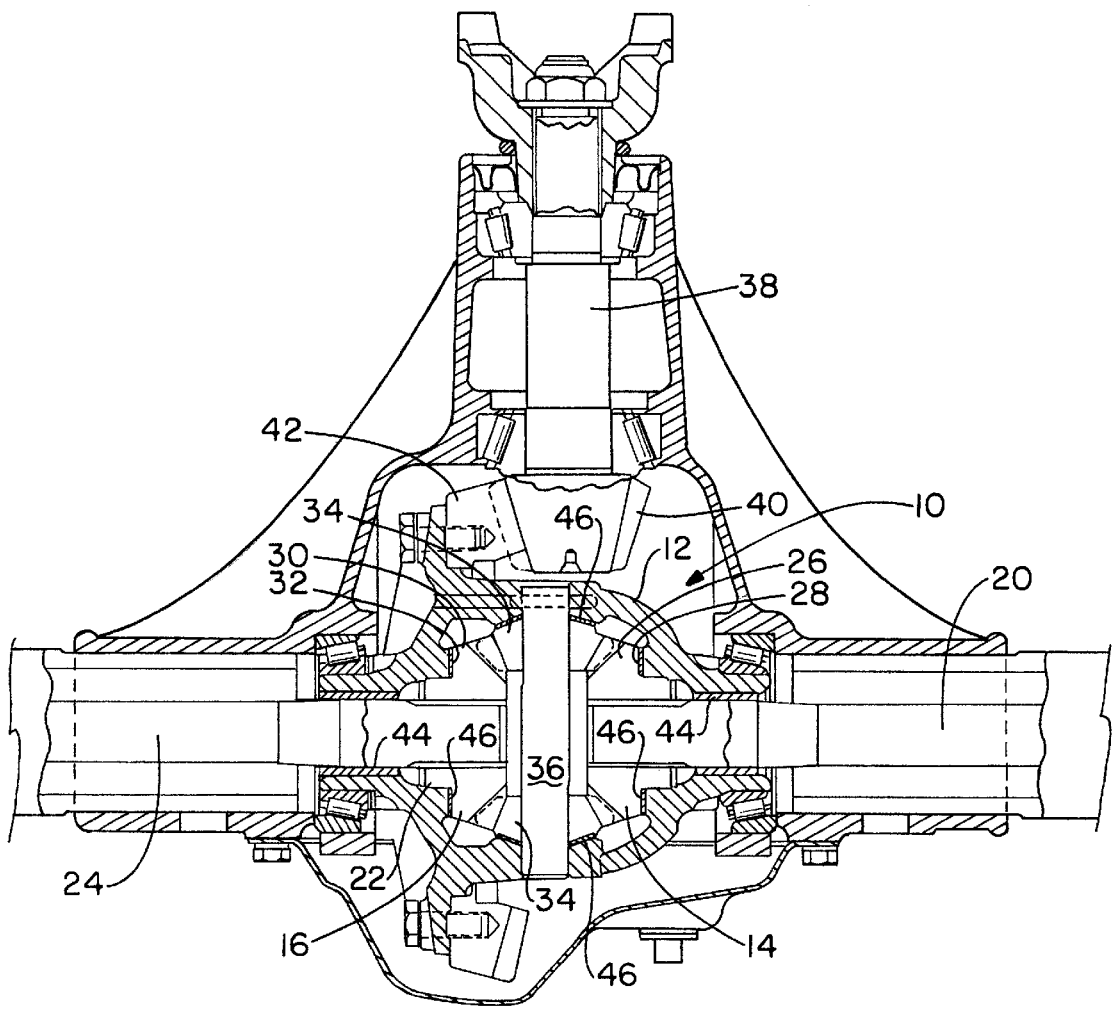
FIG. 1 illustrates a top view, partly in cross-section and partly in plan view, of a limited slip motor vehicle differential assembly in accordance with a first preferred embodiment of the present invention.

In the following detailed description of preferred embodiments of the present invention, reference is made to the accompanying drawings which, in conjunction with this detailed description, illustrate and describe several preferred embodiments of a limited slip motor vehicle differential assembly in accordance with the present invention. Referring now to FIG. 1, which illustrates a top view, partly in cross-section and partly in plan view, of a first embodiment of a motor vehicle differential assembly, generally identified by reference numeral 10, in accordance with a preferred embodiment of the present invention, limited slip motor vehicle differential assembly 10 generally includes differential housing 12 having first side gear 14 and second side gear 16 rotationally mounted therein. First side gear 14 includes axially extending portion 18 which is connected to and is rotationally fixed to first axle shaft 20. Similarly, second side gear 16 includes axially extending portion 22 which is connected to and is rotationally fixed to second axle shaft 24. First axle shaft 20 extends outwardly for mounting of a first motor vehicle tire (not shown) and second axle shaft 24 extends outwardly in the opposite direction for mounting of a second motor vehicle tire (not shown). First side gear 14 also includes radially extending portion 26 which is positioned adjacent to internal surface 28 of differential housing 12. Similarly, second side gear 16 includes radially extending portion 30 which is positioned adjacent to internal surface 32 of differential housing. Thrust washer 46 is positioned between radially extending portion 26 of first side gear 14 and internal surface 28 of differential housing 12 and between radially extending portion 30 of second side gear 16 and internal surface 32 of differential housing 12 to facilitate rotation therebetween.

At least two, and in some cases four, differential pinion gears 34 are provided between first side gear 14 and second side gear 16 to permit differentiation between the rotational speeds of first side gear 14 and second side gear 16, and hence, between first motor vehicle tire (not shown) and second motor vehicle tire (not shown). Thrust washer 46 is positioned between differential pinion gears 34 and differential housing 12 to facilitate rotation therebetween. Pinion shaft 36 extends between opposing differential pinion gears 34, one pinion shaft being provided when two differential pinion gears are present and two pinion shafts being provided when four differential pinion gears are present.

Power is generally transferred from the motor vehicle engine or motor (not shown) as rotational energy through input shaft 38 having drive pinion 40 at its rearmost end. Drive pinion 40 is engaged with ring gear 42 which in turn rotates differential housing 12, including first side gear 14, second side gear 16, differential pinion gears 34 and pinion shaft 36. Although the limited slip motor vehicle differential assembly shown in FIG. 1 is a traditional rear-wheel drive differential assembly, the teachings of the present invention are also applicable to front-wheel drive differential assemblies.

When first motor vehicle tire (not shown) and second motor vehicle tire (not shown), and hence first side gear 14 and second side gear 16, are rotating at the same rotational speed, differential housing 12, including first side gear 14, second side gear 16, differential pinion gears 34 and pinion shaft 36 all rotate together around a line which is generally aligned with the axes of first axle shaft 20 and second axle shaft 24. In the situation where there is no differentiation between first motor vehicle tire (not shown) and second motor vehicle tire (not shown), differential pinion gears 34 do not rotate, since first side gear 14 and second side gear 16 are rotating at the same speed. However, when first motor vehicle tire (not shown) and second motor vehicle tire (not shown) and hence, first side gear 14 and second side gear 16, are rotating at different speeds relative to each other, differential pinions gears 34 rotate to allow for this differentiation. This can occur under "normal" operating conditions when, for example, the motor vehicle is turning or when two tires having different diameters are used on the same axle. However, this situation can also be undesirable in some situations, such as when one of the motor vehicle tires is positioned on a lowtraction surface, such as snow or ice, and the other motor vehicle tire is positioned on a high-traction surface, such as asphalt. In this situation, differential pinion gears 34 will rotate to transfer all of the power provided by input shaft 38 to the motor vehicle wheel having less resistance, i.e, the one positioned on the low-traction surface, and none of the power will be transferred to the motor vehicle wheel having greater resistance, i.e., the one positioned on the high-traction surface, and the motor vehicle will not move with the motor vehicle tire positioned on the low-traction surface spinning.

Accordingly, a predetermined amount of a high-shear strength, non-hardening material, generally designated by reference numeral 44, is provided in the annular space present between first axle shaft 20 and differential housing 12 and second axle shaft 24 and differential housing 12. Material 44 has properties as will be described in more detail later in this specification such that some torque is transferred from rotating differential housing 12 to first axle shaft 20 and second axle shaft 24 at all times. This torque is preferably not so much that it would have any more than a minimal effect on the differentiation between rotating differential housing 12 and first axle shaft 20 and second axle shaft 24 under "normal" operating conditions, such as when the motor vehicle is turning or when motor vehicle tires having different diameters are used on the same axle. However, some torque is provided to each motor vehicle wheel at all times such that in the situation described above where one of the motor vehicle wheels is encountering a low-traction situation, such as snow or ice, rather than having all of the power diverted to spinning the motor vehicle wheel positioned on the low-traction surface, some torque is provided to the motor vehicle wheel positioned on the high-traction surface, such as asphalt, and the motor vehicle can move.

Figure 2:
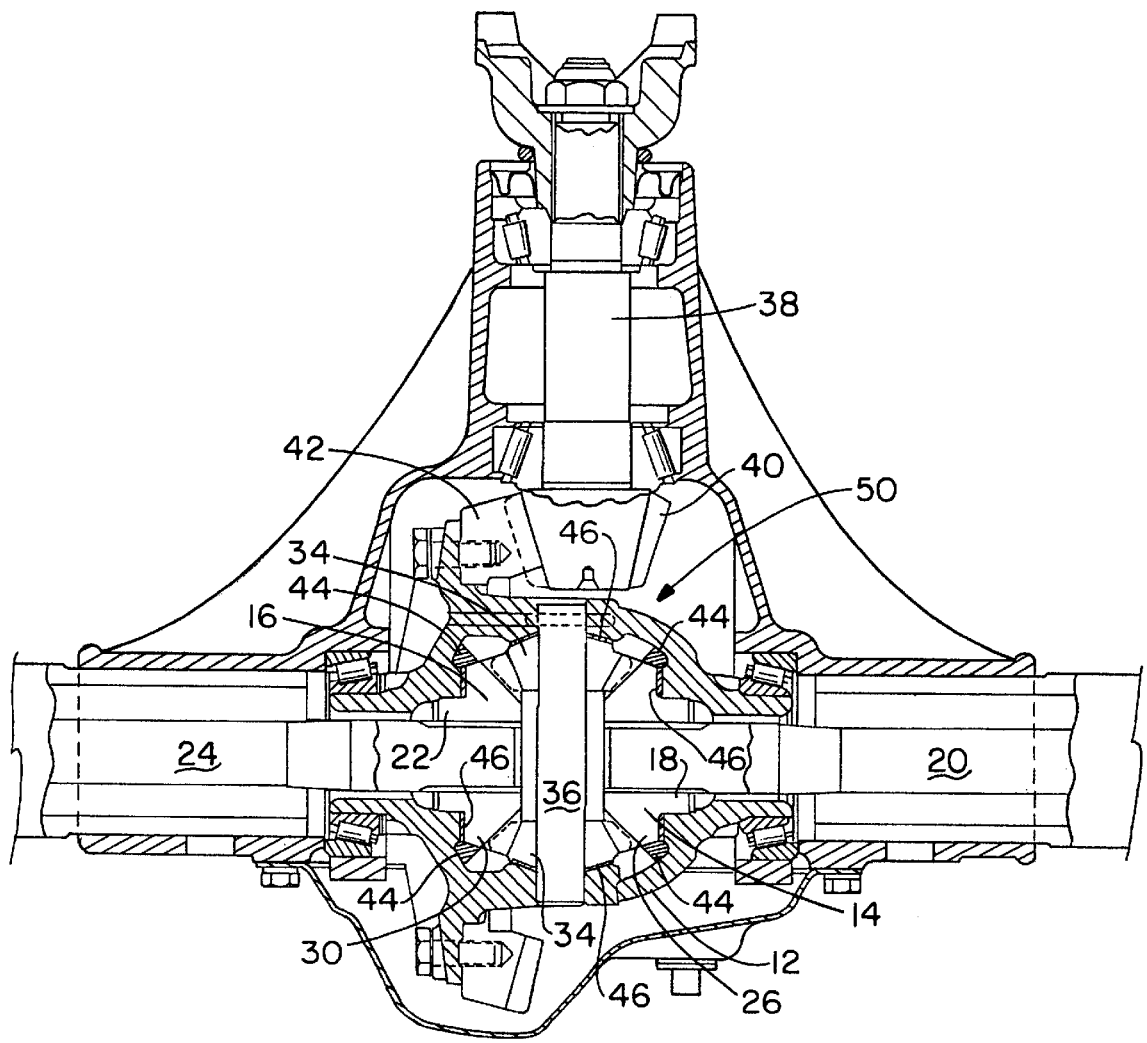
FIG. 2 illustrates a top view, partly in cross-section and partly in plan view, of a limited slip motor vehicle differential assembly in accordance with a second preferred embodiment of the present invention.

Referring now to FIG. 2, which shows a top view, partly in cross-section and partly in plan view, of a second embodiment of a limited slip motor vehicle differential assembly in accordance with the present invention, identified generally by reference number 50, material 44 is positioned between in an annular space radially beyond thrust washer 46 between first side gear 14 and differential housing 12 and in an annular space radially beyond thrust washer 46 between second side gear 16 and differential housing 12. Accordingly, some predetermined level of torque is transferred from rotating differential housing 12 to first side gear 14 and second side gear 16 at all times. This torque is preferably not so much that it would have any more than a minimal effect on the differentiation between rotating differential housing 12 and first side gear 14 and second side gear 16 under "normal" operating conditions, such as when the motor vehicle is turning or when motor vehicle tires having different diameters are used on the same axle. However, some torque is provided to each motor vehicle wheel at all times such that in the situation described above where one of the motor vehicle wheels is encountering a low-traction situation, such as snow or ice, rather than having all of the power being diverted to spinning the motor vehicle wheel positioned on the low-traction surface, some torque is provided to the motor vehicle wheel positioned on the high-traction surface, such as asphalt, and the motor vehicle can move.

Figure 3:
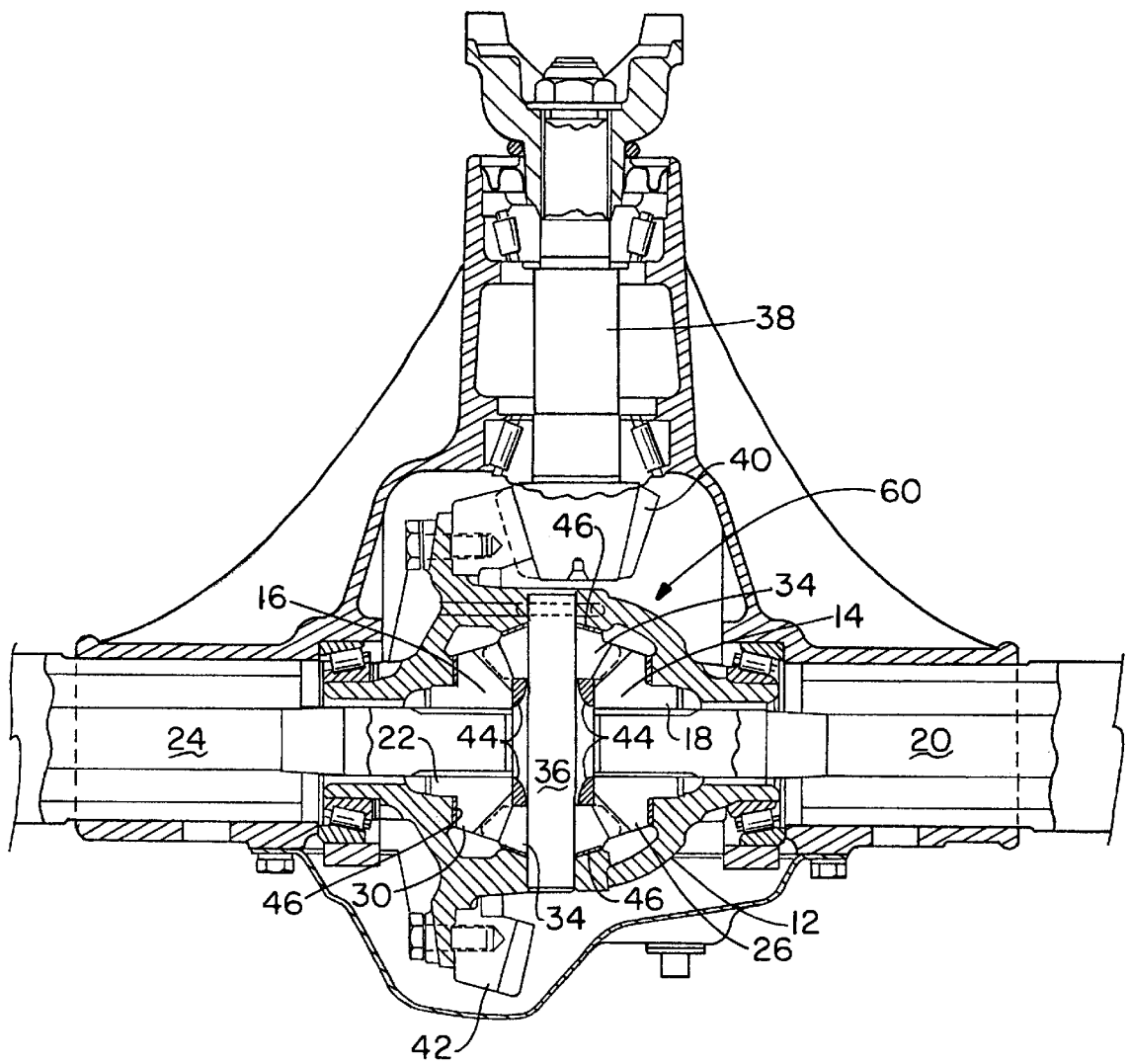
FIG. 3 illustrates a top view, partly in cross-section and partly in plan view, of a limited slip motor vehicle differential assembly in accordance with a third preferred embodiment of the present invention.

Referring now to FIG. 3, which shows a top view, partly in cross-section and partly in plan view, of a third embodiment of a limited slip motor vehicle differential assembly in accordance with the present invention, identified generally by reference number 60, material 44 is positioned between first side gear 14 and differential pinion gears 34 and between second side gear 16 and differential pinion gears 34. Accordingly, some predetermined level of resistance to rotation between first side gear 14 and differential pinion gears 34 and between second side gear 16 and differential pinion gears 34 is provided at all times. This torque is preferably not so much that it would have any more than a minimal effect on the differentiation between first side gear 14 and differential pinion gears 34 and between second side gear 16 and differential pinion gears 34 under "normal" operating conditions, such as when the motor vehicle is turning or when motor vehicle tires having different diameters are used on the same axle. However, some torque is provided to each motor vehicle wheel at all times such that in the situation described above where one of the motor vehicle wheels is encountering a low-traction situation, such as snow or ice, rather than having all of the power being diverted to spinning the motor vehicle wheel positioned on the low-traction surface, some torque is provided to the motor vehicle wheel positioned on the high-traction surface, such as asphalt, and the motor vehicle can move.

Figure 4:
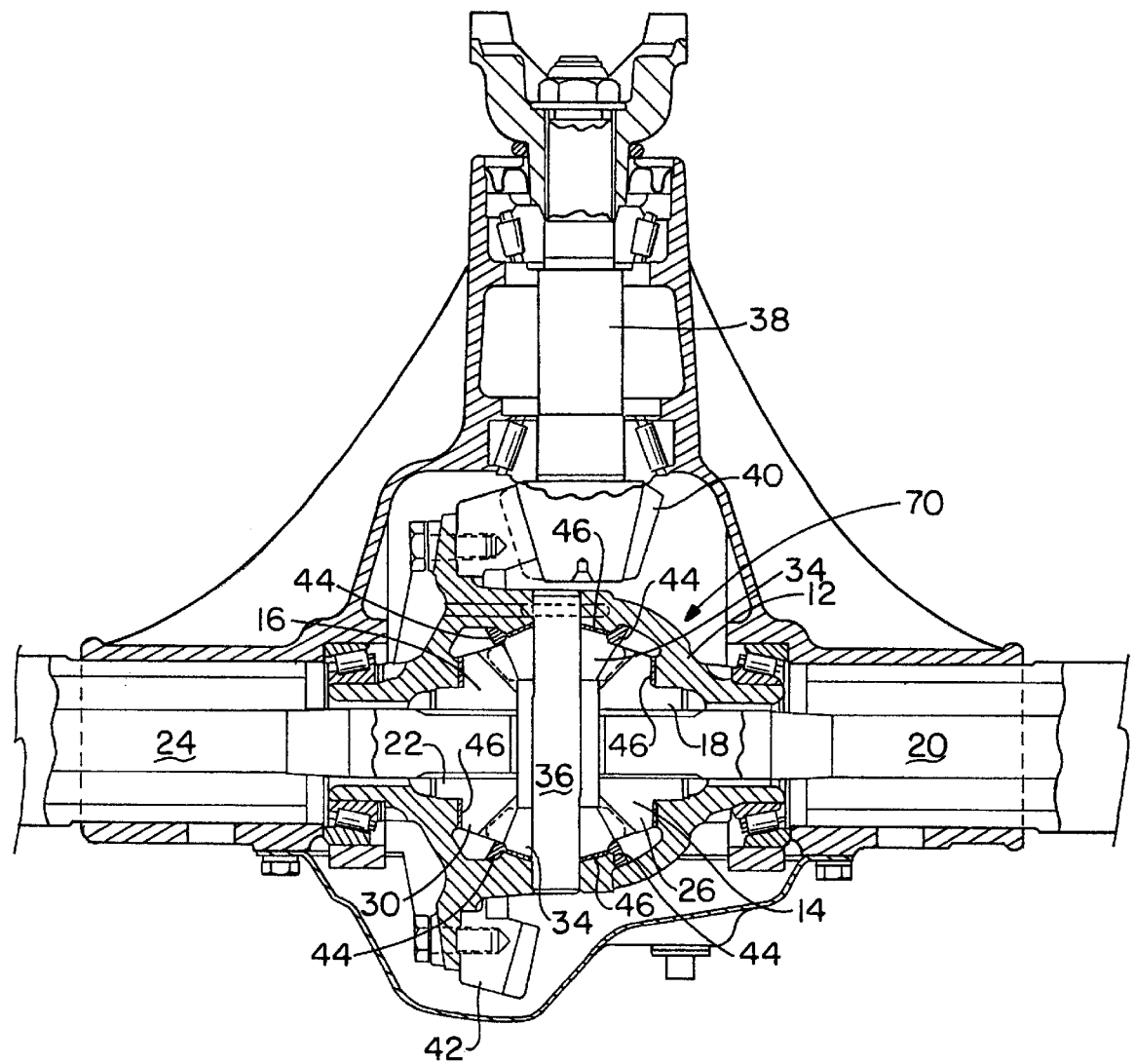
FIG. 4 illustrates a top view, partly in cross-section and partly in plan view, of a limited slip motor vehicle differential assembly in accordance with a fourth preferred embodiment of the present invention.

Referring now to FIG. 4, which shows a top view, partly in cross-section and partly in plan view, of a fourth embodiment of a limited slip motor vehicle differential assembly in accordance with the present invention, identified generally by reference number 70, material 44 is positioned between differential pinion gears 34 and differential housing 12. Accordingly, some predetermined level of resistance to rotation between differential pinion gears 34 and differential housing 12 is provided at all times. This torque is preferably not so much that it would have any more than a minimal effect on the differentiation between differential pinion gears 34 and differential housing 12 under "normal" operating conditions, such as when the motor vehicle is turning or when motor vehicle tires having different diameters are used on the same axle. However, some torque is provided to each motor vehicle wheel at all times such that in the situation described above where one of the motor vehicle wheels is encountering a low-traction situation, such as snow or ice, rather than having all of the power being diverted to spinning the motor vehicle wheel positioned on the low-traction surface, some torque is provided to the motor vehicle wheel positioned on the high-traction surface, such as asphalt, and the motor vehicle can move.

Material 44 used in each of the three preferred embodiments of a limited slip motor vehicle differential assembly described above preferably possesses the following characteristics:

1. The material will preferably adhere to metal parts;
2. The material will preferably not harden;
3. The material preferably will not shear down under continuous operating conditions;
4. The material will preferably transmit torque; and
5. The material will preferably operate in a gear oil environment at all operating temperatures, typically—40° F. to 325° F.

Although the present invention has been described above in detail, the same is by way of illustration and example only and is not to be taken as a limitation on the present invention. For example, additional cavities may be cast or machined in the motor vehicle differential assembly to hold the material to limit slip or differentiation and provide torque to each motor vehicle tire at all times in accordance with the teachings of the present invention. Also, additional components may be added to the motor vehicle differential assembly to assist in the placement of the material and assembly and disassembly of the various components thereof. Furthermore, the material could be positioned in more than one location and/or in other locations. Accordingly, the scope and content of the present invention are to be defined only by the terms of the appended claims.

What is claimed is:

1. A limited slip motor vehicle differential assembly, comprising:
   a differential housing adapted to rotate in response to rotational power received from an input shaft;
   a first side gear positioned in said differential housing, said first side gear is rotationally fixed to a first output shaft;
   a second side gear positioned in said differential housing, said second side gear is rotationally fixed to a second output shaft;
   a pair of differential pinion gears positioned intermediate said first side gear and said second side gear to permit said first side gear to differentiate in relation to said second side gear; and
   a non-hardenable, high-shear strength, torque transmitting material positioned between said output axle shaft and said differential housing and said second output shaft and said differential housing to transmit a predetermined level of torque from rotation of said differential housing to said first output shaft and said second output shaft at all times.

2. The limited slip motor vehicle differential assembly in accordance with claim 1, wherein said material is adherent to said first output shaft, said second output shaft and said differential housing, and is capable of supporting a shear under continuous working conditions.

3. The limited slip motor vehicle differential assembly in accordance with claim 1, wherein said material is positioned in an annular space between said first output shaft and said differential housing and in an annular space between said second output shaft and said differential housing.

4. The limited slip motor vehicle differential assembly in accordance with claim 1, wherein said material is compatible with fluids and gases normally present in a motor vehicle differential assembly.

5. The limited slip motor vehicle differential assembly in accordance with claim 1, wherein said material retains its operational properties in an operating range of from −40° F. to 325° F.

6. A limited slip motor vehicle differential assembly, comprising:
   a differential housing adapted to rotate in response to rotational power received from an input shaft;
   a first side gear positioned in said differential housing, said first side gear is rotationally fixed to a first output shaft;
   a second side gear positioned in said differential housing, said second side gear is rotationally fixed to a second output shaft;
   a pair of differential pinion gears positioned intermediate said first side gear and said second side gear to permit said first side gear to differentiate in relation to said second side gear; and
   a non-hardenable, high-shear strength, torque transmitting material positioned between said first side gear and said differential housing and between said second side gear and said differential housing to transmit a predetermined level of torque from rotation of said differential housing to said first side gear and said second side gear at all times.

7. The limited slip motor vehicle differential assembly in accordance with claim 6, wherein said material is adherent to said first side gear, said second side gear and said differential housing and is capable of supporting a shear under continuous working conditions.

8. The limited slip motor vehicle differential assembly in accordance with claim 6, wherein said first side gear includes a radially extending portion, at least a portion of which extends radially beyond a thrust washer positioned between said first side gear and said differential housing, and said second side gear includes a radially extending portion, at least a portion of which extends radially beyond a thrust washer positioned between said second side gear and said differential housing, and said material is positioned in an annular space between said radially extending portion of said first side gear extending beyond said thrust washer and said differential housing and in an annular space between said radially extending portion of said second side gear extending beyond said thrust washer and said differential housing.

9. The limited slip motor vehicle differential assembly in accordance with claim 6, wherein said material is compatible with fluids and gases normally present in a motor vehicle differential assembly.

10. The limited slip motor vehicle differential assembly in accordance with claim 6, wherein said material retains its operational properties in an operating range of from −40° F. to 325° F.

11. A limited slip motor vehicle differential assembly, comprising:
- a differential housing adapted to rotate in response to rotational power received from an input shaft;
- a first side gear positioned in said differential housing, said first side gear is rotationally fixed to a first output shaft;
- a second side gear positioned in said differential housing, said second side gear is rotationally fixed to a second output shaft;
- a pair of differential pinion gears positioned intermediate said first side gear and said second side gear to permit said first side gear to differentiate in relation to said second side gear; and
- a non-hardenable, high-shear strength, torque transmitting material positioned between said first side gear and said differential pinion gears and between said second side gear and said differential pinion gears to inhibit rotation of said differential pinion gears in relation to said first side gear and said second side gear at all times.

12. The limited slip motor vehicle differential assembly in accordance with claim 11, wherein said material is adherent to said first side gear, said second side gear and said differential pinion gears and is capable of supporting a shear under continuous working conditions.

13. The limited slip motor vehicle differential assembly in accordance with claim 11, wherein said material is compatible with fluids and gases normally present in a motor vehicle differential assembly.

14. The limited slip motor vehicle differential assembly in accordance with claim 11, wherein said material retains its operational properties in an operating range of from −40° F. to 325° F.

15. A limited slip motor vehicle differential assembly, comprising:
- a differential housing adapted to rotate in response to rotational power received from an input shaft;
- a first side gear positioned in said differential housing, said first side gear is rotationally fixed to a first output shaft;
- a second side gear positioned in said differential housing, said second side gear is rotationally fixed to a second output shaft;
- a pair of differential pinion gears positioned intermediate said first side gear and said second side gear to permit said first side gear to differentiate in relation to said second side gear; and
- a non-hardenable, high-shear strength, torque transmitting material positioned between said differential pinion gears and said differential housing to inhibit rotation of said differential pinion gears in relation to said differential housing at all times.

16. The limited slip motor vehicle differential assembly in accordance with claim 15, wherein said material is adherent to said differential pinion gears and said differential housing and is capable of supporting a shear under continuous working conditions.

17. The limited slip motor vehicle differential assembly in accordance with claim 15, wherein said differential pinion gears are positioned adjacent an internal surface of said differential housing and said material is positioned in an annular space between said differential pinion gears and said internal surface of said differential housing.

18. The limited slip motor vehicle differential assembly in accordance with claim 15, wherein said material is compatible with fluids and gases normally present in a motor vehicle differential assembly.

19. The limited slip motor vehicle differential assembly in accordance with claim 15, wherein said material retains its operational properties in an operating range of from −40° F. to 325° F.

* * * * *